US012694857B2

(12) United States Patent
Sharabi

(10) Patent No.: US 12,694,857 B2
(45) Date of Patent: Jul. 28, 2026

(54) SELECTIVE TONE SHIFTING DEVICE

(71) Applicant: Elchanan Sharabi, Bareket (IL)

(72) Inventor: Elchanan Sharabi, Bareket (IL)

( * ) Notice: Subject to any disclaimer, the term of this patent is extended or adjusted under 35 U.S.C. 154(b) by 878 days.

(21) Appl. No.: 18/014,188

(22) PCT Filed: Jul. 16, 2021

(86) PCT No.: PCT/IL2021/050872
§ 371 (c)(1),
(2) Date: Jan. 3, 2023

(87) PCT Pub. No.: WO2022/018718
PCT Pub. Date: Jan. 27, 2022

(65) Prior Publication Data

US 2023/0260490 A1 Aug. 17, 2023

(30) Foreign Application Priority Data

Jul. 19, 2020 (IL) ........................................ 276134

(51) Int. Cl.
*G10H 1/20* (2006.01)
*G10H 1/34* (2006.01)

(52) U.S. Cl.
CPC ................ *G10H 1/20* (2013.01); *G10H 1/34* (2013.01); *G10H 2210/066* (2013.01); *G10H 2210/325* (2013.01); *G10H 2220/221* (2013.01)

(58) Field of Classification Search
CPC ...... G10H 1/20; G10H 1/34; G10H 2210/066; G10H 2210/325; G10H 2220/221
USPC ........................................................... 84/619
See application file for complete search history.

(56) References Cited

U.S. PATENT DOCUMENTS 4,205,576 A * 6/1980 Deutsch .................. G10H 1/10 84/DIG. 22
5,278,346 A * 1/1994 Yamaguchi ........... G10H 5/005 84/723
5,773,742 A * 6/1998 Eventoff ............... G10H 7/002 84/613
5,902,949 A * 5/1999 Mohrbacher ........ G10H 1/0008 84/645
6,958,442 B2 * 10/2005 Moussa ............... G10H 1/0066 84/645

(Continued)

FOREIGN PATENT DOCUMENTS

EP 0507355 A2 * 10/1992 .............. G10H 1/32

*Primary Examiner* — Christina M Schreiber

(57) ABSTRACT

This invention is directed to a tone shifting device that includes an analog to digital (A/D) converter configured to receive an audio output from a musical instrument to convert it into a digital signal and to pass it to a computing unit; an input device configured to allow a player to select at least one note to be shifted in real time during playing a musical instrument; a computing unit configured to receive the input signal from the A/D converter and a second input from the input device and to shift a selected note/s to a lower/higher tone in real time during playing; a digital to analog (D/A) converter configured to receive the signals from the computing unit and convert them to analog form; and an amplifier configured to receive the analog signal from said D/A converted and play the played modified music through a loudspeaker of the amplifier. The tone shifting device allow selective shifting of a selected musical note in real time during playing.

3 Claims, 4 Drawing Sheets

(56) References Cited

U.S. PATENT DOCUMENTS

| | | | | |
|---|---|---|---|---|
| 7,935,877 | B2 | 5/2011 | Lemons | |
| 8,338,686 | B2 | 12/2012 | Mann | |
| 9,336,763 | B1 * | 5/2016 | Zhang | G10H 1/34 |
| 9,583,084 | B1 * | 2/2017 | Fagan | G10H 1/38 |
| 10,319,354 | B2 * | 6/2019 | Laughlin | G10H 1/0016 |
| 2003/0145714 | A1 * | 8/2003 | Moussa | G10H 1/0066 84/654 |
| 2005/0087061 | A1 * | 4/2005 | Sim | G10H 1/0066 84/719 |
| 2007/0191976 | A1 * | 8/2007 | Ruokangas | G10L 21/04 704/E21.017 |
| 2008/0264241 | A1 * | 10/2008 | Lemons | G10L 21/06 84/645 |
| 2010/0307321 | A1 * | 12/2010 | Mann | G09B 15/00 84/613 |
| 2011/0017048 | A1 * | 1/2011 | Bos | G10H 1/20 84/600 |
| 2011/0203444 | A1 * | 8/2011 | Yamauchi | G10H 1/10 84/622 |
| 2016/0196343 | A1 * | 7/2016 | Rafii | G06F 16/683 707/730 |
| 2017/0018202 | A1 * | 1/2017 | Marradi | G09B 15/023 |
| 2023/0260490 | A1 * | 8/2023 | Sharabi | G10H 3/125 84/619 |

* cited by examiner

SELECTIVE TONE SHIFTING DEVICE

RELATED APPLICATIONS

This application is a National Phase of PCT Patent Application No. PCT/IL2021/050872 having International filing date of 16 Jul. 2021, which claims the benefit of priority Israeli patent application number 276134 filed on Jul. 19, 2020.

TECHNOLOGICAL FIELD

This invention is related to musical instruments, and to electronic processing during the playing. More particular, the invention is directed to a novel tone shifting device for selective tone shifting in real time.

BACKGROUND

In music, a note is a symbol denoting a musical sound. Notes can represent the pitch and duration of a sound in musical notation (for more details see: to https://en.wikipedia.org/wiki/Musical_notation). A note can also represent a pitch class. Pitch is a perceptual property of sounds that allows their ordering on a frequency-related scale. Pitch is an auditory sensation in which a listener assigns musical tones to relative positions on a musical scale based primarily on their perception of the frequency of vibration (https://en.wikipedia.org/wiki/Pitch_(music)#cite_note-plack-6). The oscillations of sound waves can often be characterized in terms of frequency. Pitches are usually associated with, and thus quantified as, frequencies (in cycles per second, or hertz), by comparing the sounds being assessed against sounds with pure tones (ones with periodic, sinusoidal waveforms).

In most mechanical instruments, one can play tones and half tone. However, in oriental music usage of quarter tones is also required. There are several solutions available in the market to reduce half tone into quarter tone.

One main solution that is applicable only to guitar is adding to the guitar a free fret with a rubber band around the guitar, such that the user moves the free frat along the guitar and position it on the specific tone that needed to be lower. This method is limited to a single tone and it is cumbersome and physically disturbs the player and may cause damage to the guitar.

One another solution that is even more cumbersome than the first one is by adding frats all around the guitar. This solution indeed allows to play quarter tones however, in order to add the frats, there is a need to notch the guitar, and practically, the player has difficulty to find the notes and play the guitar. Both solutions mentioned above are not applicable to other instruments such as piano and trumpet.

Thus, there is a need in the art for a better solution that may be used by various playing tools, that will not damage the instrument and will be friendly to use to the player. The present invention is aimed to provide such solution.

The term "half tone musical note" refers herein to a note within an A to G and super notes indicated by # ("Diez"), providing together notes in each octave, namely each octave includes half tone musical notes of C, super C, D, super D, E, F, super F, G, super G, A, super A, and B.

The term "half tone musical instrument" refers herein to a guitar or any other musical playing instrument, being configured to play half tone musical notes only.

The term "one octave keyboard" refers herein to a one octave conventional keyboard, having twelve keys, each for one half tone note.

The term "tone shifting device" and the term "music processor" are used herein interchangeably and refer to the same.

SUMMARY OF THE INVENTION

The present invention, in one main aspect is directed to a novel device configured to be connected to a musical tool and allow the user to selectively lower one or more played tones in real time. The lowering of the played tone may be reduction to a half tone or to a quarter tone. The lowering of the tone is performed in a simple and intuitive manner without causing damage to the musical instrument and without disturbing the player to play the music. Once the device was set to reduce a certain note, it will proceed in real time, selectively to lower this note into half or quarter tone played in real time until the player will instruct the device to stop.

In one main aspect the present invention is directed to a tone shifting device comprising: an analog to digital (A/D) converter configured to receive an audio output from a musical instrument to convert t into a digital signal and to pass it to a computing unit; an input device configured to allow a player to select at least one note to be shifted in real time during playing a musical instrument; a computing unit configured to receive the input signal from the A/D converter and a second input from the input device and to shift a selected note/s to a lower/higher tone in real time during playing; a digital to analog (D/A) converter configured to receive the signals from the computing unit and convert them to analog form; and an amplifier configured to receive the analog signal from said D/A converted and play the played modified music through a loudspeaker of the amplifier. The analog to digital converted may also receive the input from musical instrument with a mounted microphone. The input device may be a keyboard having twelve keys, each key designates a different musical note.

Upon selection of at least one key on said keyboard and pressing onto the selected key, the musical note designated by that key is shifted selectively every time it is being played until said key is being pressed again to cancel the shifting of said musical note.

The computing unit samples the digital signals received and perform a multi pitch detection so as to detect the selected musical note to be shifted according to the characteristic frequency of said musical note.

The tone shifting is performed selectively in real time during playing. In a preferred embodiment, the shifting is lowering the played tone to half tone or quarter tone.

In some optional embodiments, the input device or parts thereof is virtual and operated by dedicated software.

BRIEF DESCRIPTION OF THE DRAWINGS

Examples illustrative of embodiments of the disclosure are described below with reference to figures attached hereto. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (Figs.) are listed below.

DETAILED DESCRIPTION OF EMBODIMENTS

Figure 1:
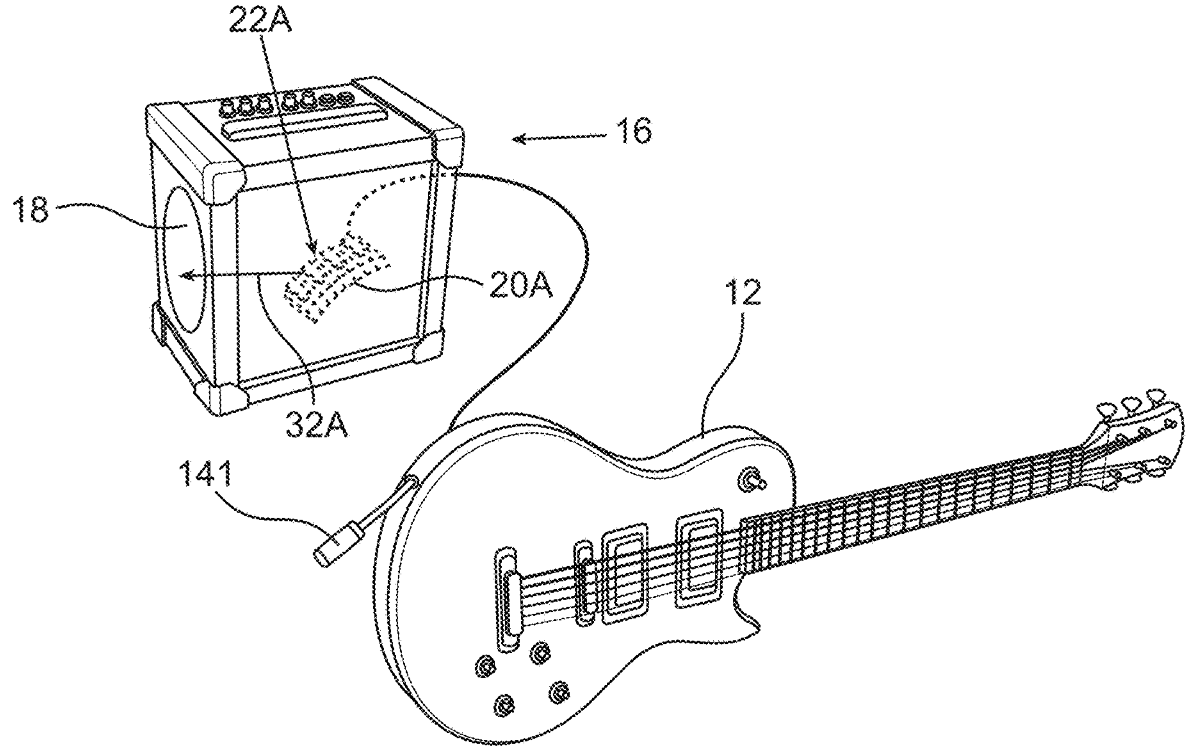
FIGURE 1 Prior Art
FIG. 1 is a schematic isometric illustration of a standard electric guitar including electronic accessories.

In the following description, various aspects of a novel music processor for selective tone lowering will be described. For the purpose of explanation, specific configurations and details are set forth in order to provide a thorough under the invention.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The description examples and materials presented in the description, as well as in the claims, should not be construed as limiting, but rather as illustrative.

The present invention is directed in one main aspect to a selective tone shifting device that is configured and operable to allow shifting of musical tone from a played note to a lower note. The novel tone shifting device provided herein is easy to implement and can be used with off the shelf music playing instruments, it is friendly to the user and cause no damage to the music playing instrument that it is connected to. In some embodiments, the novel tone shifting device may also be referred to hereinbelow as a music processor for selective tone lowering. In some optional embodiments it may be used to lower at least one musical note of half tone into quarter tone, in real time during playing the music. In some other embodiments the novel music processor may be used to selectively lower a selected musical note from a played tone to a lower tone, not necessarily to quarter tone. In contrast to other devices available in the market such as the Pitch shifter that lowers all notes played without any selectivity (see for example Free Online Pitch Shifter OnlineToneGenerator.com).

In one main aspect, the present invention is aimed to allow selective tone shifting by first, converting the mechanical sounds (pure sounds that output from a mechanical music playing instrument) into electronic sounds, and then by dedicated software and the novel selective tone shifting device of the invention, to selectively lower a predetermined played note. The novel tone shifting device allows to simultaneously shift selectively more than one note in real time. As will be described here in below, the novel tone shifting device operates in real time during playing.

In order to use the novel tone shifting device, the music playing instrument must be connected to a microphone such that the output of the microphone is the input of the novel music processor for selective lowering tones. In a preferred embodiment, the music processor for lowering tones may comprise twelve buttons, each designate a different musical note. When the player press or otherwise activate one or more buttons of the twelve buttons, the novel music processor provided herein receives a signal to lower the relevant note/s correlated to the selected button/s and to selectively lower it each and every time it is being played until a different instruction is received. The player may select (push/press) more than one button simultaneously and the selected musical note/s will be lowered until a different command will be received.

In some optional embodiments of the invention, the musical instrument is accompanied by a keyboard which determines which tones drop one or more to a quarter of a tone. The keyboard is connected to a controller and detects the incoming tone and converts the tone to the keyboard setting and lowers it or opposite by a quarter tone. The converter is connected to an amplifier that allows playing a quarter of a tone in real time according to the playing of the user.

The keyboard contains 12 keys and allows selecting one or more characters to download per quarter tone by pressing the keyboard. The tone shifting device allows playing different types of music that contain quadrants of tones of the player's choice by pressing the appropriate keys shortly or shortly before tapping the selected tone and string. The mechanism allows and benefits the performance and accuracy of the performance and quality of music while providing maximum comfort to the player.

In some optional embodiments pressing the keyboard prepares quarter-tone activation and another click cancels the quarter-ton activation. The keyboard controls 12 characters. The player may simultaneously create a quarter-tone playback effect in characters.

Reference is now made to the figures.

FIG. 1 is a schematic isometric illustration of a standard electric guitar 12 including electronic accessories. This drawing illustrates the current state of the art and it should be clear that guitar 12 is only one none limiting example that is used for simplicity of explanation and other playing instruments such as piano, trumpet or else may also be used for the same.

As illustrated in this drawing, the musical playing instrument 12 may be accompanied by a microphone 141 for recording the music played. Amplifier 16 is connected to microphone 141, thus receives the input thereof. A loudspeaker 18 of amplifier 16, being an example of an electronic playing device, electronically plays music recorded by microphone 141.

Amplifier 16, being non-analogous, includes a note-identifier 22A, for recognizing the halftone musical note 32A played by guitar 12, say note D. Note-identifier 22A is herein represented by a virtual one octave keyboard, and identified note 32A is herein represented by a key 20A of the virtual one octave keyboard. Note-identifier induces playing of note 32A by loudspeaker 18 of amplifier 16. However, musical instrument 12 even together with amplifier 16 is limited to play half tone musical notes only.

Figure 2A:
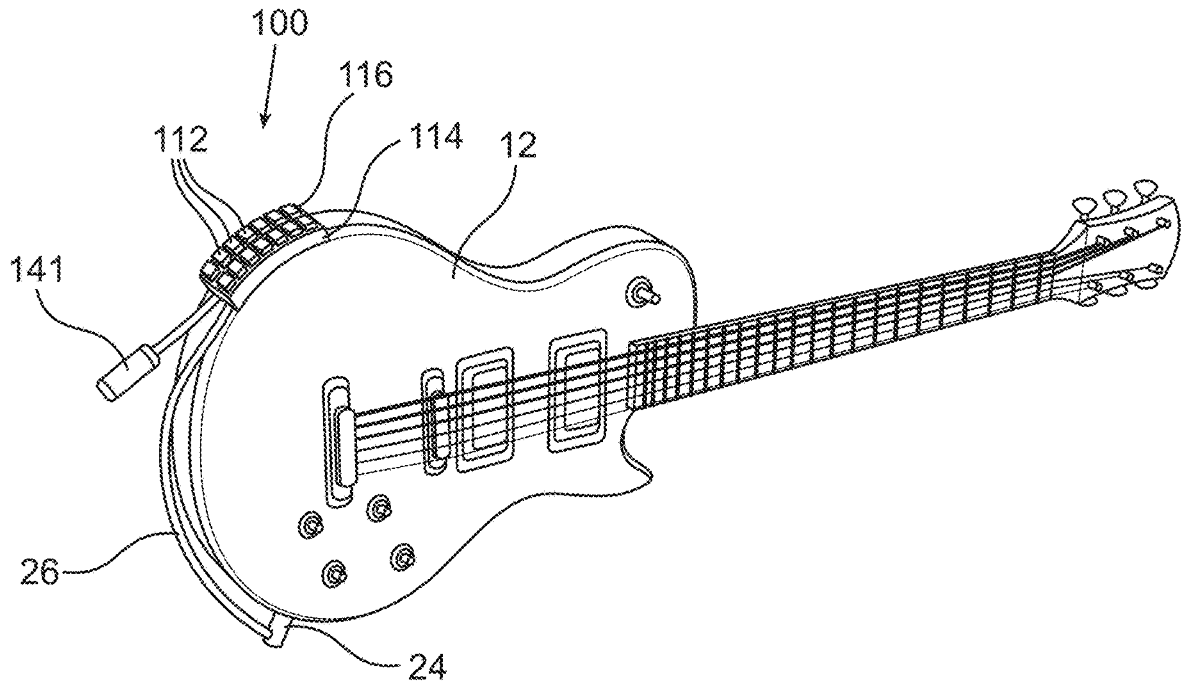
FIG. 2A is a schematic isometric illustration of the standard electric guitar of FIG. 1 connected to a tone shifting device according to one optional embodiment of the invention.

FIG. 2A is a schematic isometric illustration of the standard electric guitar 12 of FIG. 1 connected to a tone shifting device 100 according to one optional embodiment of the invention.

In this drawing connector 24 is connected to the audio output of guitar 12 and connect the audio output to the novel tone shifting device 100 by cable 26. In the none-limiting example illustrated in this drawing, note shifting device 100 comprises a keyboard 116 having twelve (12) keys 112, each represents a note. When the player intends to lower a played tone, he presses a respective key 112 and upon pressing that key, tone shifting device 100 shifts the selected note until the player press the respective key once again to cancel the shifting mode. In some optional embodiments, note shifting device 100 is positioned onto the playing instrument. In such embodiment, the note shifting device 100 may comprise a flexible housing 114 that allows to position and attach the note shifting device onto various flat and curved surfaces of different playing instruments.

In some further embodiments note shifting device 100 is positioned in adjacent to the musical playing instrument and not onto it. Optionally, keyboard 116 and keys 112 may be mechanical buttons as seen in the drawing. Alternatively, keys 112 may be virtual and being played on a screen of a smart device via a dedicated software or App. The output 141 of note shifting device 100 may be inserted into an amplifier. In some other optional embodiments, the output of note shifting device 100 may be transmitted wirelessly to an amplifying unit. More detailed description of the operation methodology of the note shifting device 100 will be provided with reference to FIG. 5 here in below.

Figure 2B:
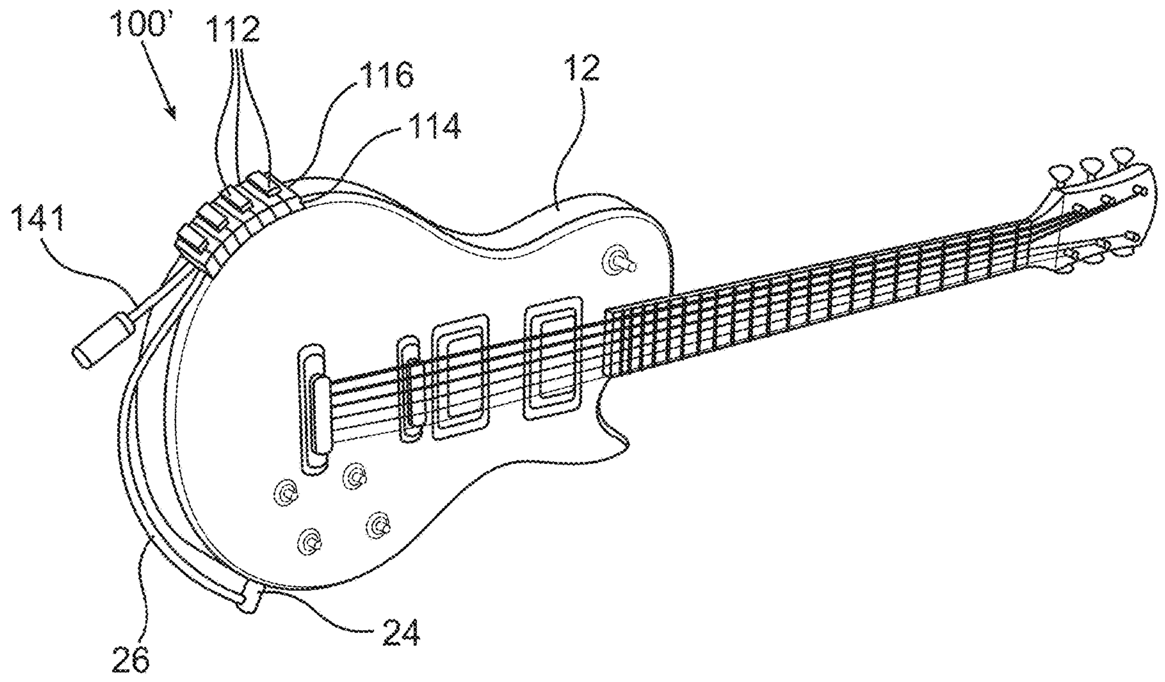
FIG. 2B is a schematic illustration of the standard musical playing instrument of FIG. 1 connected to another variation of a tone shifting device according to one another optional embodiment of the invention.

FIG. 2B is a schematic illustration of the standard musical playing instrument of FIG. 1 connected to another optional variation of a tone shifting device 100' in which keyboard 116 is designed as a piano keyboard. The functionality of both variation is similar. Shown in this drawing are guitar 12, tone shifting device 100' connected by connector 24 and to the audio output of the guitar 12 by cable 26, keyboard 116, keys 112, and note shifting device output 141.

Figure 3:
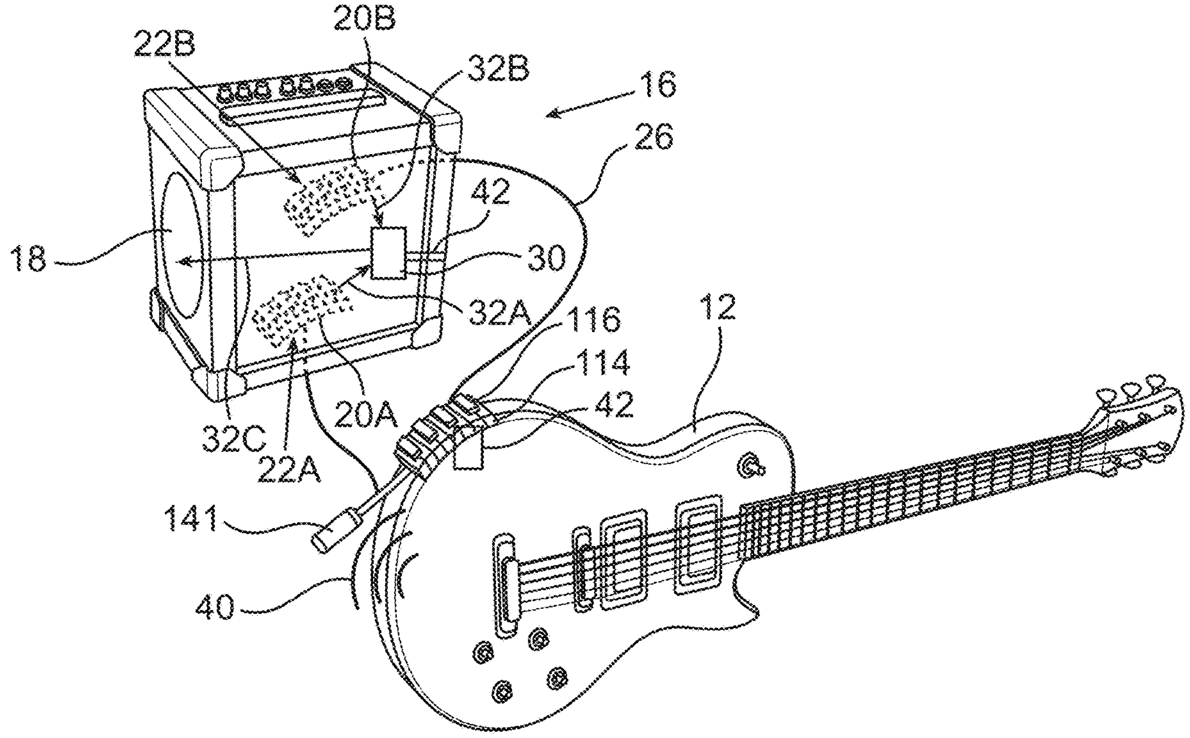
FIG. 3 is a schematic illustration of the standard musical playing instrument of FIG. 2B connected to a tone shifting device and further connected to an electric assembly.

FIG. 3 is a schematic illustration of guitar 12 of FIG. 2B, connected to tone shifting device 100' and further connected to an amplifier 16. In accordance with one optional example, when the player plays note D (not shown) and presses key 112 of keyboard 116 that correspond to note D. Note-identifier 22A identifies the half musical note 32A played by guitar 12, say note D. Note-identifier 22A is represented by virtual one octave keyboard 22A, and identified note 32A is represented in this drawing by virtual key 20A of virtual one octave keyboard 22A. Identified note 32A is outputted to a note determinator 30.

Amplifier 16 further includes a note-identifier 22B, for identifying the half musical note 32B of physical keyboard 116 pressed, if pressed, by the player. Note-identifier 22B is represented by a virtual one octave keyboard 22B and identified note 32B is represented by a key 20B of virtual one octave keyboard 22B. identified note 32B is outputted to note determinator 30. Loudspeaker 18 of amplifier 16 plays a tone determined by note determinator 30 as a function of identified notes 32A and 32B.

According to one scenario, in case identified notes 32A and 32B are different, amplifier 16 will play a note 32C being equal to note 32A played by the player, meaning that the pressing of physical keyboard 116 was not intended to change the playing in this case.

In another scenario, when 32A and 32B are determined to be equal, meaning that the player desires to make a change, amplifier 16 will play a note 32C, being different from note 32A, such as having an interval for being a quarter of a tone higher or lower than notes 32A and 32B, according to the player selection inputted to a user interface 42. For example, user interface 42 may select one or more musical notes played by guitar 12 to be moved half a note higher or lower.

In summary, in one aspect, the invention is directed to a music processor that comprise: a microphone 141 for recording music 40 played by a half-tone musical instrument 12; a first note-identifier 22A, for identifying a half-tone musical note 32A recorded by the microphone 141; and a note determinator 30, for determining a musical note 32C to be electronically played as a function of the half-tone musical note 32A recorded by the microphone 141.

The microphone 141 may be part of the musical instrument 12, thus the invention may be directed to a music processor 100, comprising: a first note-identifier 22A, for identifying a half-tone musical note 32A recorded by a microphone 141 recording a half tone musical instrument 12; and a note determinator 30, for determining a musical note 32C to be electronically played as a function of the half-tone musical note 32A recorded by the microphone 141.

The note determinator 30 may be configured to determine the played musical note 32C to have an interval from the half-tone musical note 32A recorded by the microphone 141. The interval may be a quarter of tone, half tone, or multiplication of the half tone.

The music processor 100 may further include a keyboard 116 including pressable keys 112, each representing a half tone; a second note-identifier 22B, for identifying a half-tone musical note 32B pressed by the physical keyboard 116, wherein the note determinator 30 may be configured for determining the musical note 32C to be electronically played, further as a function of the half tone musical note 32B pressed by the physical keyboard 116, i.e. in addition to be the function of note played by musical instrument 12.

The note determinator 30 may be configured to determine the musical note 32C to be electronically played to be a quarter tone moved from the half-tone musical note 32A recorded by the microphone 141 in case the half-tone musical note 32B pressed by the physical keyboard 116 is equal to the half-tone musical note 32A recorded by the microphone 141. The keyboard 116 may constitute a one octave keyboard including twelve keys.

The music processor 100 may further include a user interface 42, for selecting the function of the note determinator 30.

The half-tone musical note 32A recorded by the microphone 141 for playing the musical note 32C according to the function, may be all of the half-tone musical notes 32A recorded by the microphone 141, for example for moving all of the tones one tone higher, or it may be only the half-tone musical notes 32A recorded by the microphone 141 and selected according to user interface 42.

In the figures and/or description herein, the following reference numerals have been mentioned: numeral 100/100' denotes the music processor (note shifting device) of the invention; 12: musical instrument; 14: microphone; 16: amplifier; 18: electronic playing device, such as a loudspeaker, or an electronic input to an additional music processor; 20A: a virtual key representing the identified half-tone musical note played by musical instrument 12; 20B: a virtual key representing the identified half-tone musical note pressed on physical keyboard 116; 22A: an electronic element named "note-identifier", for identifying half-tone musical note played by musical instrument 12; 22B: another electronic element named "note-identifier" for identifying the half-tone musical note pressed on physical keyboard 116; 116: keyboard for selecting musical notes; 112: key of keyboard 116, being pressed by the user; 30: electronic element, named "note determinator" f or determining musical note 32C to be electronically played; 32A: half-tone music note identified as played by musical instrument 12; 32B: half-tone music note identified as pressed on keyboard 116; 32C: music note determined to be electronically played; 40: music produced by musical instrument 12; 42: user interface; for selecting the function of note determinator 30, namely for selecting how music note 32C being electronically played depends on inputted music notes 32A and 32B; 70: Saxophone; 141A: electric guitar audio output; 141B: output from a mounted microphone; 102: A/D converter; 104: computing unit; 106: D/A converter and speaker; 170: second input device.

Figure 4:
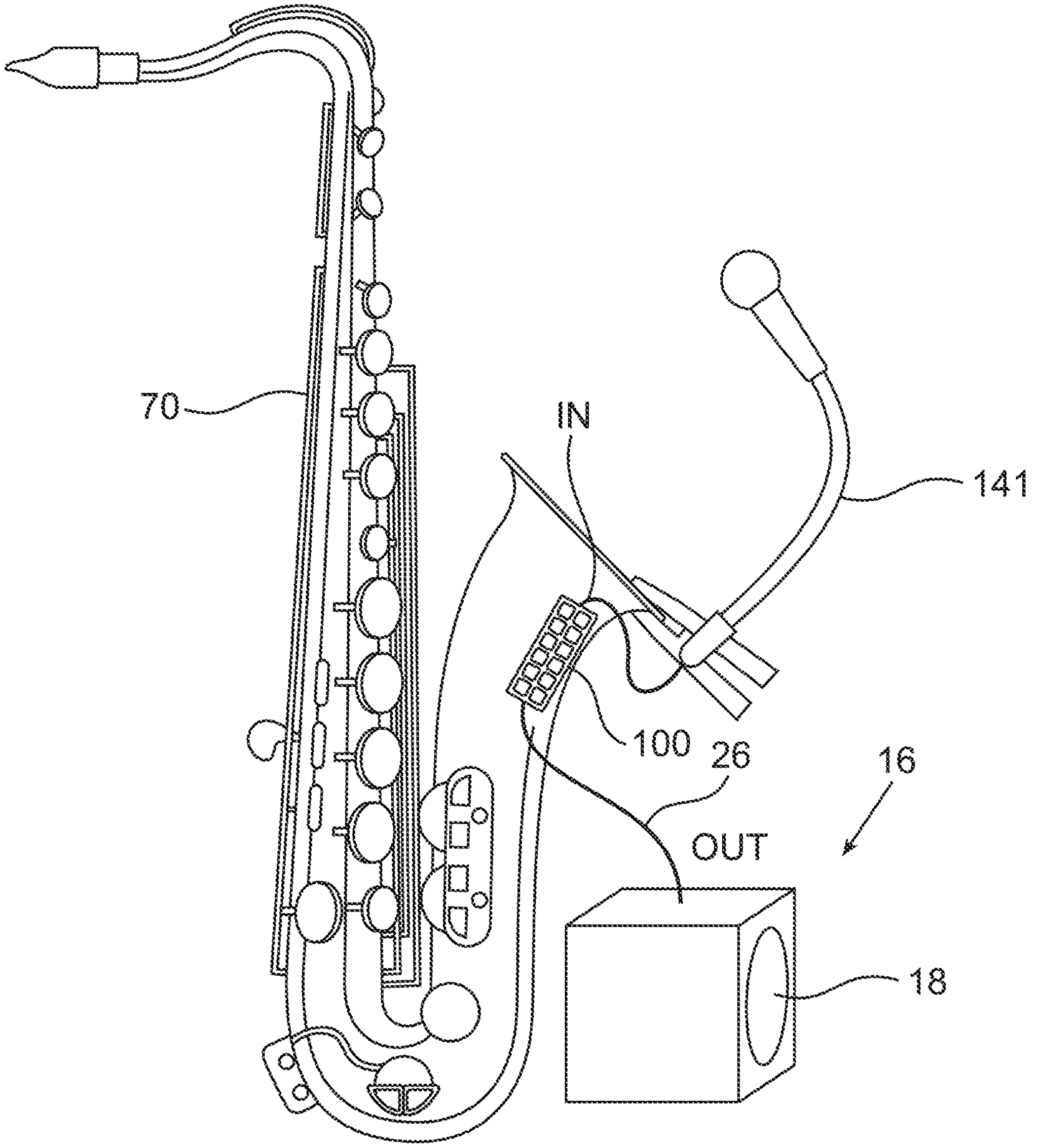
FIG. 4 is a schematic isometric illustration of the standard Saxophone reconnected to a microphone and to a tone shifting device according to one another optional embodiment of the invention.

FIG. 4 is a schematic side view illustration of a standard Saxophone 70 connected to a microphone 141. The output of the microphone serves as the input audio signal to the tone shifting device 100 of the invention. The player determines which notes to shift and the modified output signal from the tone shifting device 100 enters amplifier 16 and exit to the surrounding through its loudspeaker 18. Connection of the standard saxophone to the tone shifting device of the invention open new horizons to the player and allows to receive a varied music instead of monotone single tone melody. It should be clear that the saxophone and guitar are only some optional musical instruments that the tone shifting device of the invention may be implemented onto and other musical instruments are also applicable and should be considered within the scope of this invention.

Figure 5:
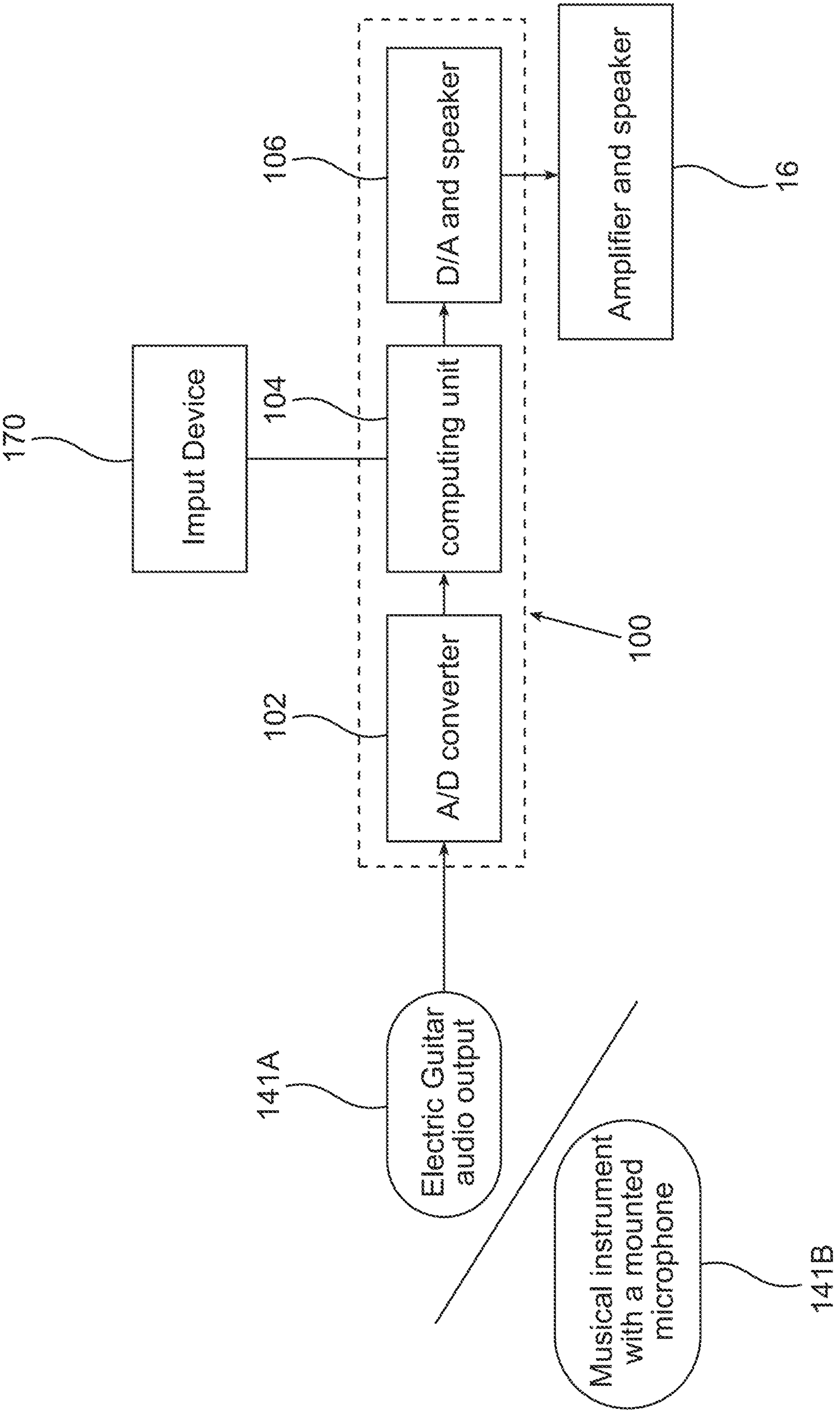
FIG. 5 is a schematic block diagram of the tone shifting device of the invention and the input and outputs of the tone shifting device in accordance with some examples of the invention.

FIG. 5 is a schematic block diagram of the tone shifting device 100/100' of the invention and the input and outputs of the tone shifting device in accordance with some examples of the invention.

In accordance with embodiments of the invention, first input to the tone shifting device 100 may be for example, an analog audio input such as an electric guitar audio output 141A or an output from a mounted microphone 141B of a musical instrument. Second input 170 is an input device port such as a computer keyboard, a costume input device, or even a network port that receive network commands via the internet. first input is inserted into Analog to Digital converter (A/D converter) 102 and the converted signal enters computing unit 104. second input 170 also enters computing unit 104 and the output of computing unit 104 enters into a Digital to Analog converting unit and speaker (D/A and speaker) 106 that is an analog audio output port. The output signal is the tone-specific frequency shifted audio. This audio is further passed into unit 16 that is an amplifier and a speaker for real-time listening. Alternatively, the analog audio that output unit 106 may be passed to a digital storage device. Computing unit 104 is a general-purpose computing device unit (CPU, RAM and Storage) capable of running code.

In more detail, a normal operation mode of tone shifting device 100 comprises the following:

1. Note selection stage: via an input device 170 (such as but not limited to a keyboard) connected to first input 141A/141B, one or more notes are selected (out of 12 possible notes), in advance to the device operation to be shifted.
2. The musical instrument is connected (either through the instruments microphone or through a mounted microphone) to second input 170.
3. The player starts playing the musical instrument (i.e., an electric guitar), naturally.
4. In real-time, the selected tones, and only the selected tones, from tone selection stage are shifted in frequency by the computing unit 104. Other tones that are played or heard simultaneously to the selected tones will not be shifted in frequency and will pass through.
5. The result of the tone-selective frequency shift musical signal is converted to an analog signal through unit 106 and is output through unit 16 of Amplifier and loudspeaker.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above-described embodiments that would still be covered by the present invention.

The invention claimed is:

1. A real-time quarter-tone shifting device configured to be externally and acoustically coupled with a mechanical musical instrument through a microphone, for receiving analog audio signals representing mechanical sound vibrations that represent musical notes produced in real time by the mechanical musical instrument and outputting the musical notes in real time through a loudspeaker such that one or more notes, temporarily selected by a player during performance, are lowered by a quarter tone, wherein the temporary selection can be modified or cancelled by the player during the performance, comprising:

(a) an analog-to-digital converter configured to be connected electrically to the microphone, wherein the microphone is configured to be employed by the mechanical musical instrument to capture said mechanical sound vibrations that represent ambient sound waves produced in real time by the mechanical musical instrument;

(b) a computing unit;

(c) a note-selecting device; and (d) a digital-to-analog converter configured to be connected electrically to an amplifier that is configured to play music through the loudspeaker;

wherein the analog-to-digital converter is configured to (i) receive the analog audio signals from the microphone that represent the musical notes played in real time by the mechanical musical instrument, (ii) convert the analog audio signals into digital signals, and (iii) send the converted digital signals to the computing unit;

wherein the note-selecting device is configured to enable a player of the mechanical musical instrument to select one or more particular notes from twelve optional octave notes to be lowered by a quarter tone in real time;

wherein the computing unit is configured to (i) receive from the note-selecting device an input as to the one or more particular notes selected by the player during the performance, (ii) receive the converted digital signals from the analog-to-digital converter, and (iii) change the converted digital signals by lowering the selected one or more particular notes by a quarter tone, and (iv) send the changed digital signals to the digital-to-analog converter;

wherein the digital-to-analog converter is configured to (i) receive the changed digital signals from the computing unit, (ii) convert the changed digital signals to analog form, and (iii) send the changed analog form to the amplifier for being played through the loudspeaker;

wherein the real-time quarter-tone shifting device is configured to enable the loudspeaker to play in real time the played musical notes in a different way from a way said played musical notes are actually played on the mechanical musical instrument, such that said one or more selected notes are played in real time through the loudspeaker at a quarter tone lower than they are actually played on the mechanical musical instrument.

2. The real-time quarter-tone shifting device of claim 1, wherein said note-selecting device includes a keyboard with twelve keys, each key is associated with a certain musical note of said octave.

3. The real-time quarter-tone shifting device of claim 1, wherein said note-selecting device is associated with a display configured to enable said player to choose said one or more particular notes.

* * * * *